(12) United States Patent
Frost

(10) Patent No.: US 6,304,647 B1
(45) Date of Patent: Oct. 16, 2001

(54) TELEPHONE DEVICE PROVISIONING PRE-ORDER ENTRY SYSTEM

(75) Inventor: Bill Frost, Richardson, TX (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/138,689

(22) Filed: Aug. 24, 1998

(51) Int. Cl.$^7$ ....................................... H04M 3/42
(52) U.S. Cl. .................. 379/201.12; 379/201.04; 379/247
(58) Field of Search ..................... 379/265, 229, 379/266, 201, 93.12, 90.01, 93.23, 27, 9

(56) References Cited

U.S. PATENT DOCUMENTS

| | | | |
|---|---|---|---|
| 5,644,619 | * | 7/1997 | Farris et al. ............................ 379/27 |
| 5,898,765 | * | 4/1999 | Teglovic et al. ...................... 379/120 |
| 5,953,389 | * | 9/1999 | Pruett et al. ............................. 379/9 |
| 5,956,024 | * | 9/1999 | Strickland et al. ................... 345/327 |
| 6,031,904 | * | 2/2000 | An et al. .............................. 379/201 |
| 6,104,798 | * | 8/2000 | Lickiss et al. ....................... 379/201 |

\* cited by examiner

*Primary Examiner*—Fan Tsang
*Assistant Examiner*—Nora J Putt

(57) ABSTRACT

A telephone service pre-order entry system, and method of operation thereof, for provisioning of telephone service. The pre-ordering functions of address validation, long distance PIC assignment, telephone number assignment, customer service records transfer, features selection, facility information determination and installation date selection are performed in an integrated and automated manner. In order to perform telephone service provisioning pre-order entry, customer information including an address is received. An address validation screen, including a field requesting an address, is displayed. The customer information, including the address, is entered into the address validation screen and the address is validated. A list of available long distance primary interexchange carriers is displayed and a carrier is selected from the list. A telephone number selection screen, which includes a second list of telephone service features that are both available for provisioning and are being offered, is displayed. A dispatch information screen including information relating to telephone service facilities that are present at the validated address is displayed and facilities that are required for installation of telephone service at the validated address are determined. An installation date selection screen including available installation dates is displayed and an installation date is selected from among the available installation dates. An order including the entered information is accepted or rejected and a record of the order is output.

20 Claims, 11 Drawing Sheets

TELEPHONE DEVICE PROVISIONING PRE-ORDER ENTRY SYSTEM

FIELD OF THE INVENTION

The present invention relates to a pre-ordering system for provisioning of telephone service.

BACKGROUND OF THE INVENTION

When telephone service is to be established for a new telephone number, several pre-ordering functions must be performed to setup an order to provision the service. The address at which the service is to be established must be validated, to ensure that provisioning is not attempted at an incorrect or non-existent address. A telephone number must be assigned to the service, and a long distance primary interexchange carrier (PIC) must be assigned to the telephone number. Where the new service is being established by an existing customer, such as when the customer moves from one location to another, that customer's migrated service records must be transferred to the new service. The features of the new service must be selected. The connections and facilities available at the new address must be determined in order to determine the work that is necessary to establish the service. Finally, the date of the installation of the service must be selected.

In the past, these functions had to be performed largely separately and often manually, resulting in delay and inefficiency. A need arises for a solution by which all of these functions may be performed together in an automated manner.

SUMMARY OF THE INVENTION

The present invention is a pre-order entry system for provisioning of telephone service. The pre-ordering functions of address validation, long distance PIC assignment, telephone number assignment, customer service records transfer, features selection, facility information determination and installation date selection are performed in an integrated and automated manner.

In order to perform telephone service provisioning pre-order entry, customer information including an address is received. An address validation screen, including a field requesting an address, is displayed. The customer information, including the address, is entered into the address validation screen and the address is validated. A list of available long distance primary interexchange carriers is displayed and a carrier is selected from the list. Telephone number assignments are then requested. This is then followed by a feature selection screen including a list of telephone service features that are both available for provisioning and are being offered. A telephone service feature is selected from the displayed list. A dispatch information screen including information relating to telephone service facilities that are present at the validated address is displayed and facilities that are required for installation of telephone service at the validated address are determined. An installation date selection screen including available installation dates is displayed and an installation date is selected from among the available installation dates. An order including the entered information is accepted or rejected and a record of the order is output.

In one aspect of the present invention, a telephone number reservation screen is displayed, responsive to determining that a new telephone number is to be reserved and a new telephone number is assigned to the validated address.

In another aspect of the present invention, a telephone number migration screen is displayed, responsive to determining that a telephone number is to be migrated and the telephone number and associated features are migrated to the validated address.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
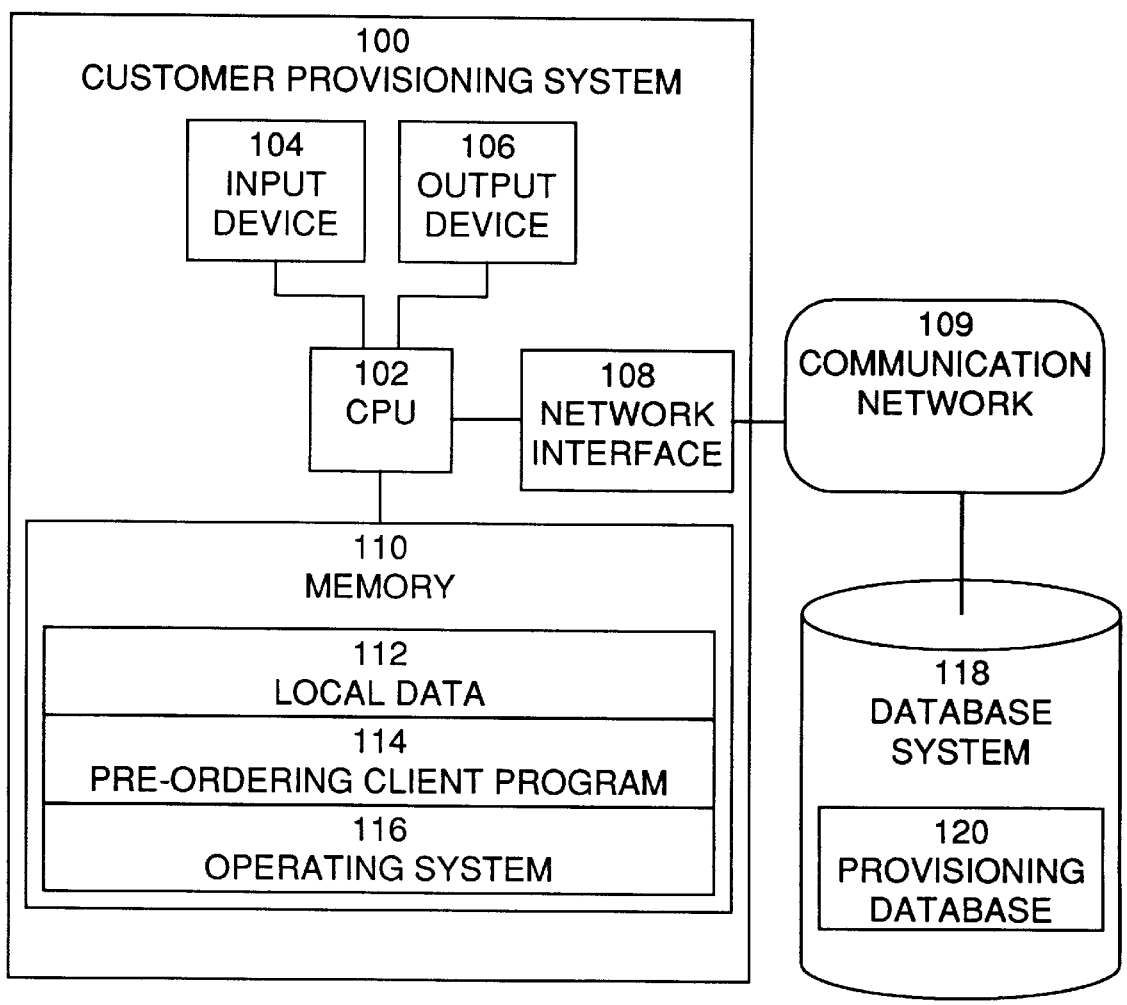
FIG. 1 is a block diagram of a provisioning pre-order system, according to the present invention.

A provisioning system 100, according to the present invention, is shown in FIG. 1. Provisioning system 100 includes central processing unit (CPU) 102, which is connected to input device 104, output device 106, network interface 108 and memory 110. CPU 102 may comprise a microprocessor, for example, an INTEL PENTIUM processor, or CPU 102 may comprise a mini-computer or mainframe processor. Input device 104 allows input information to be entered and may comprise a keyboard, a mouse, a floppy disk drive, a tape drive, and/or other removable media drive or interchange device. Output device 106 allows the output of provisioning information generated by provisioning system 100 and typically comprises a high-speed printer. Network interface 108 couples provisioning system 100 to communications network 109 and allows an alternate path for input of data or output of provisioning information. Communications network 109 may be, for example, a local or wide area network, the public switched telephone network, or the Internet. Network interface 108 may comprise a conventional modem or local/wide area network adapter, depending upon communications network 109. Memory 110 may include devices such as random access memory or read only memory, which store data and instructions for execution by CPU 102. Memory 110 may also include devices such as magnetic disk drives, optical disk drives and tape drives, which store data and program instructions used by the present invention.

Memory 110 includes local data 112, pre-ordering client program 114 and operating system 116. Local data 112 includes information that is stored locally at the customer provisioning system. Pre-ordering client program 114 comprises program instructions that are executed by CPU 102 in order to carry out the present invention.

Database system 118 is communicatively coupled to customer provisioning system 100 by communications network 109. Database system 118 includes provisioning database 120, which stores data used by and generated by the provisioning process of the present invention.

Figure 2:
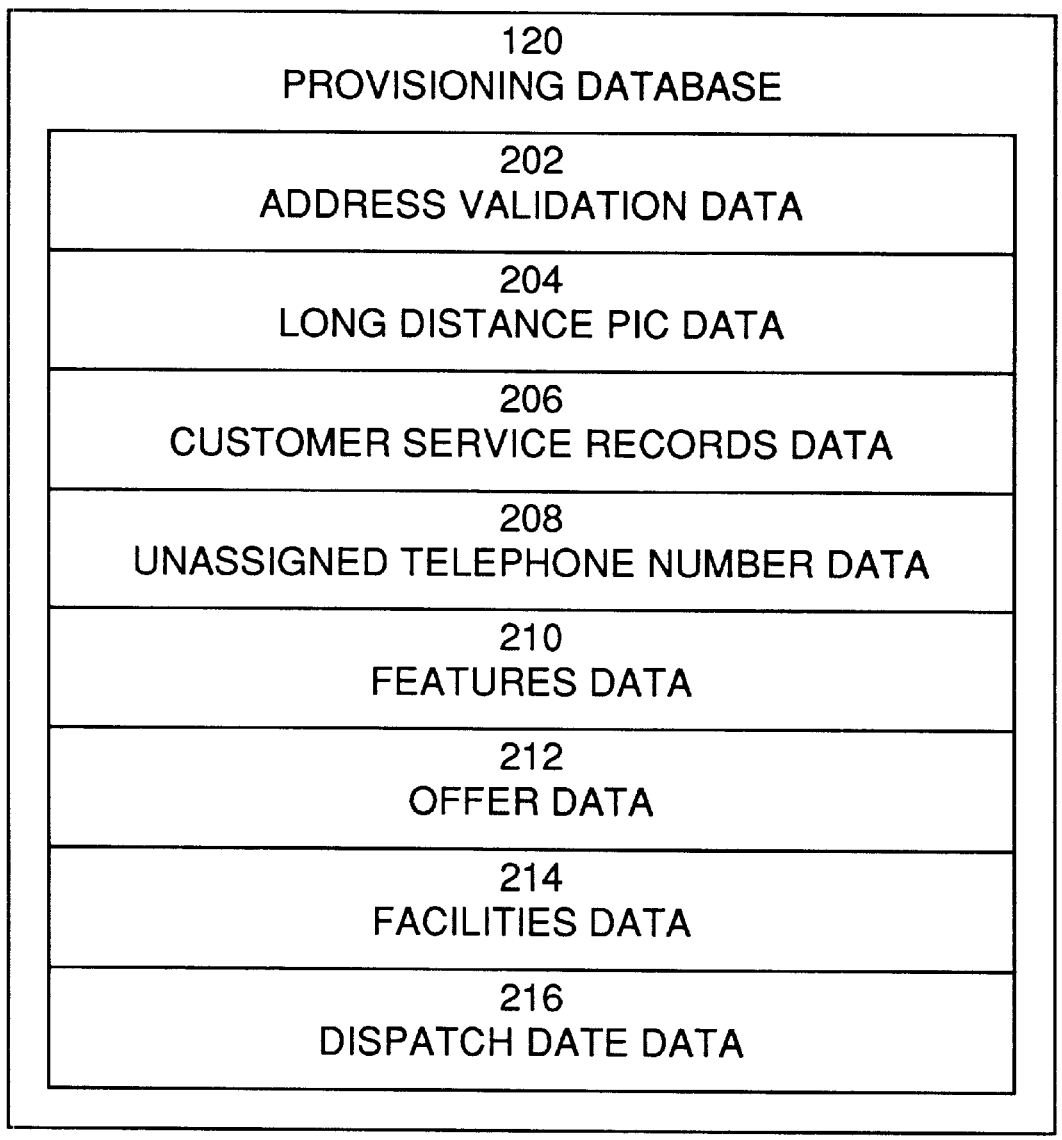
FIG. 2 is a block diagram of a provisioning database shown in FIG. 1.

Database 120 is shown in more detail in FIG. 2. Provisioning database 120 includes address validation data 202, long distance primary interexchange carrier (PIC) data 204, customer service records data 206, unassigned telephone number data 208, features data 210, offer data 212, facilities data 214 and dispatch date data 216. Address validation data 202 includes information, such as valid addresses, which allows customer addresses to be checked for correctness and validated. Long distance PIC data 204 includes information about long distance carriers that may be selected as the primary carrier for the telephone number or numbers being provisioned. Customer service records data 206 includes information about existing customers. Since many telephone orders are placed by existing customers, rather than by new customers, information about the existing customers and their existing service can be obtained from the customer service records. Unassigned telephone number data 208 includes unassigned telephone numbers that may be selected for assignment. Features data 210 includes information about the service features that are technically available at the customer address. Offer data 212 includes information about the service features that are being offered at the customer address, as well as prices for service features and packages of service features. Facilities data 214 includes information about the telephone connections and facilities that are present at the customer address. Dispatch date data 216 includes information about the availability and schedule of telephone installers who may be dispatched to the customer address to install the telephone service.

Figure 3:
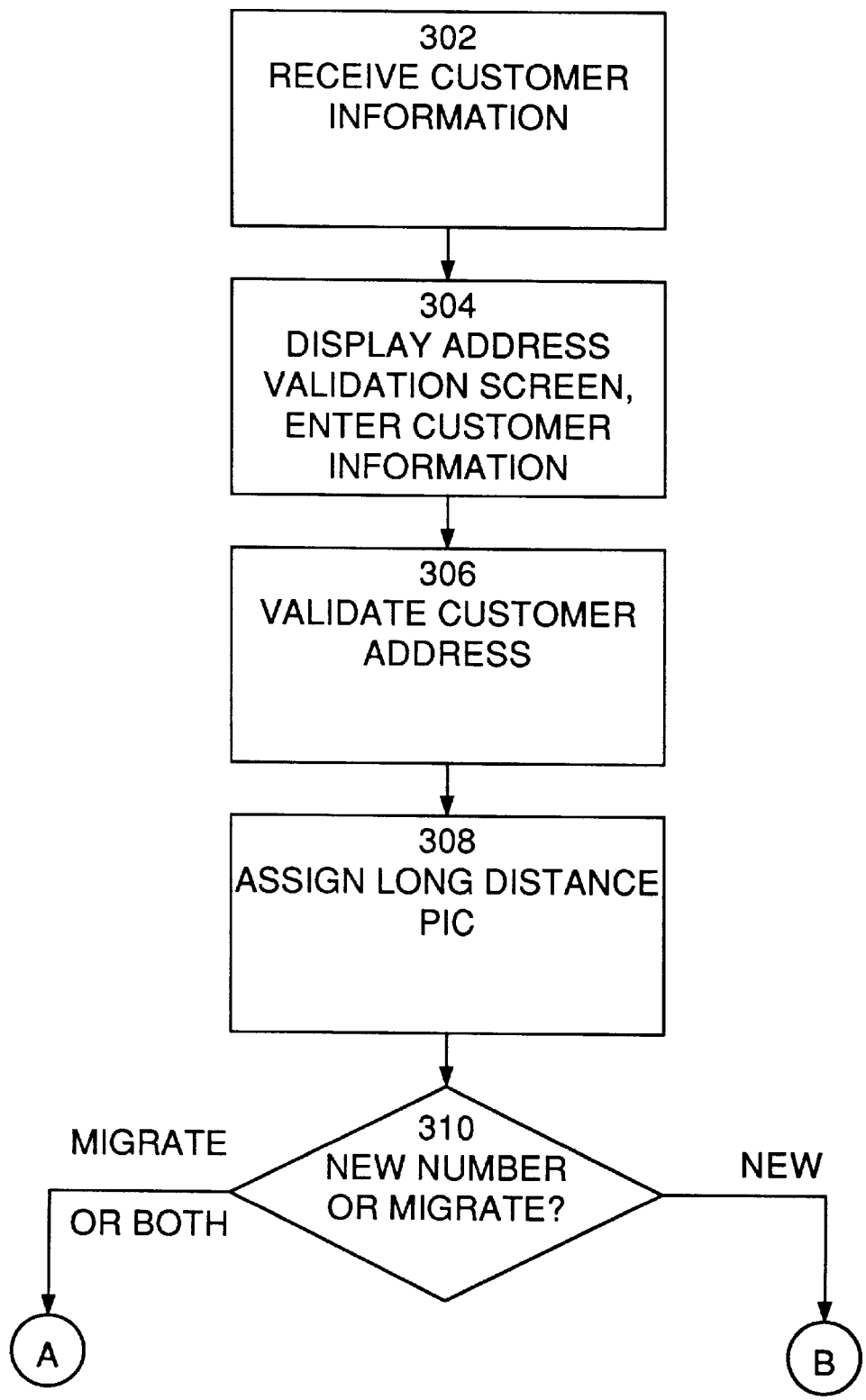
FIGS. 3, 4 and 5 are flow diagrams of a provisioning pre-ordering process, implemented in the system of FIG. 1.
Figure 4:
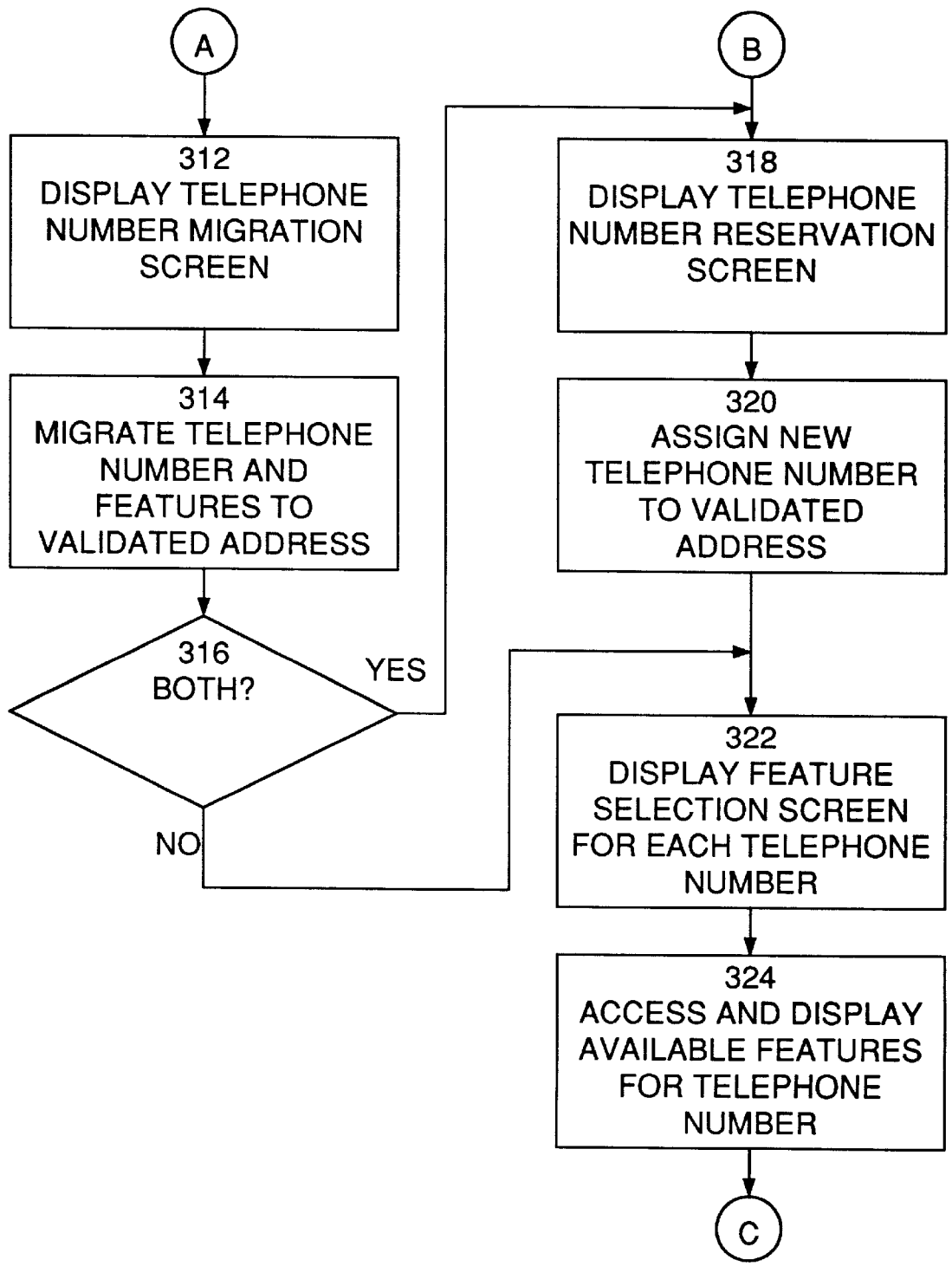
Figure 5:
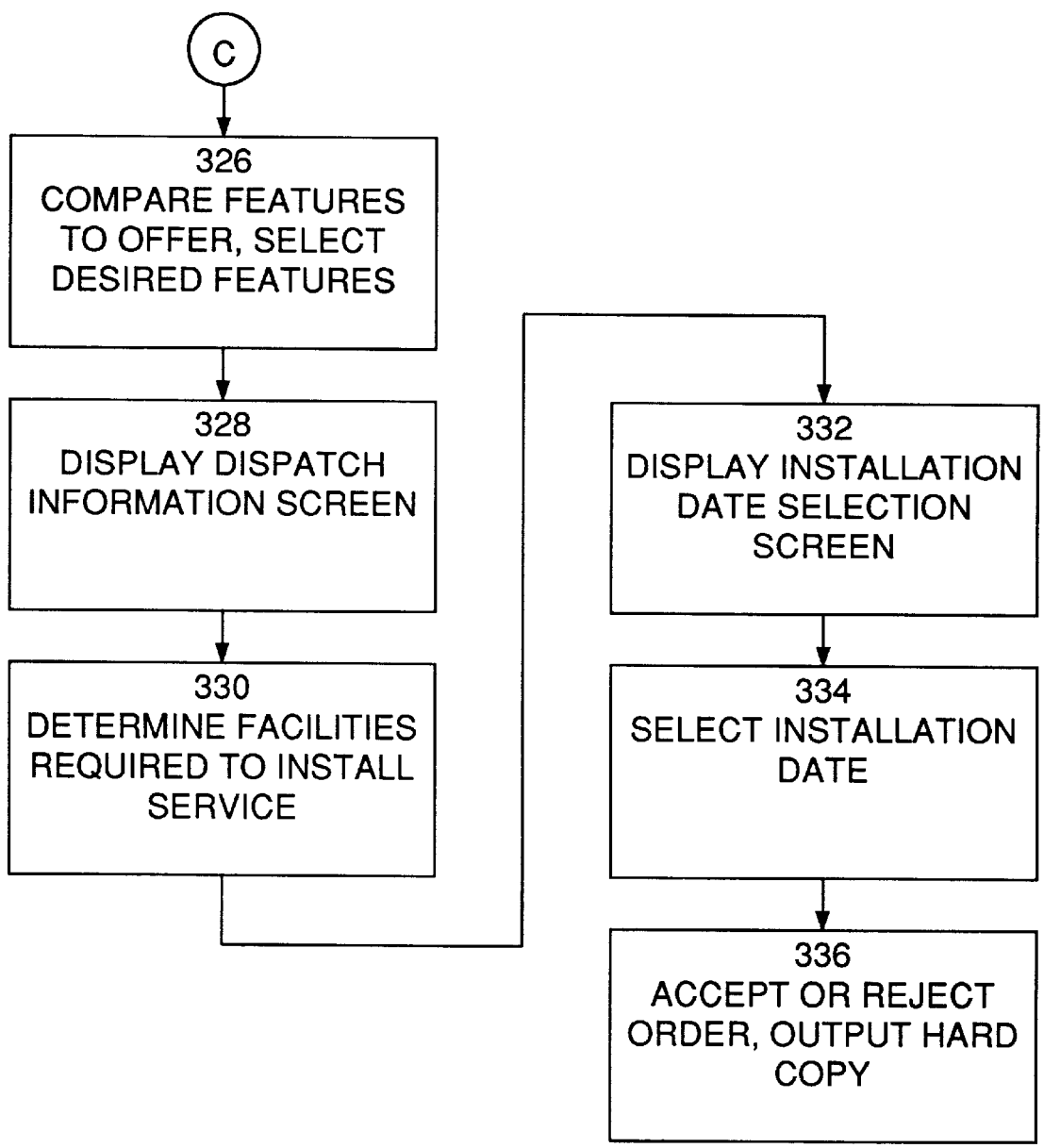
Figure 6:
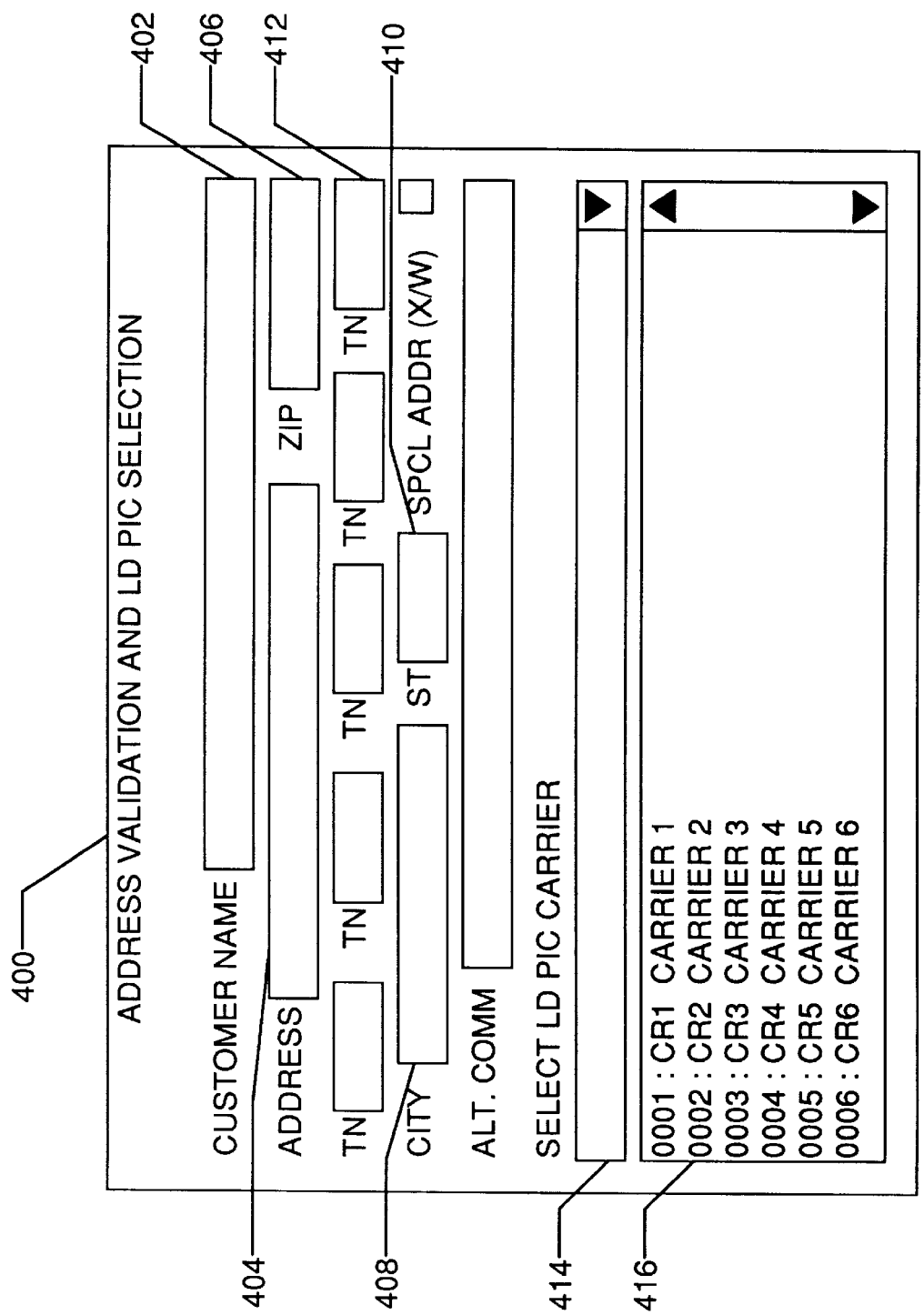
FIG. 6 is an exemplary address validation screen displayed by the system of FIG. 1.

A pre-ordering process, according to the present invention, is shown in FIGS. 3, 4 and 5. It is best viewed in conjunction with FIGS. 6–11. The process begins with step 302, in which customer information, including a customer address, is received by provisioning system 100. Typically, the customer information is manually entered into a screen displayed by provisioning system 100. Thus, in step 304, an address validation screen, such as the exemplary screen shown in FIG. 6, is displayed and the customer information is entered into the screen. In step 306, the customer address is validated to ensure that it is correct. In step 308, the long distance primary interexchange carrier (PIC) for the telephone number or numbers being provisioned is assigned. In step 310, it is determined whether the number being provisioned is a newly assigned telephone number, or whether an already assigned telephone number is being migrated to a new address.

Figure 7:
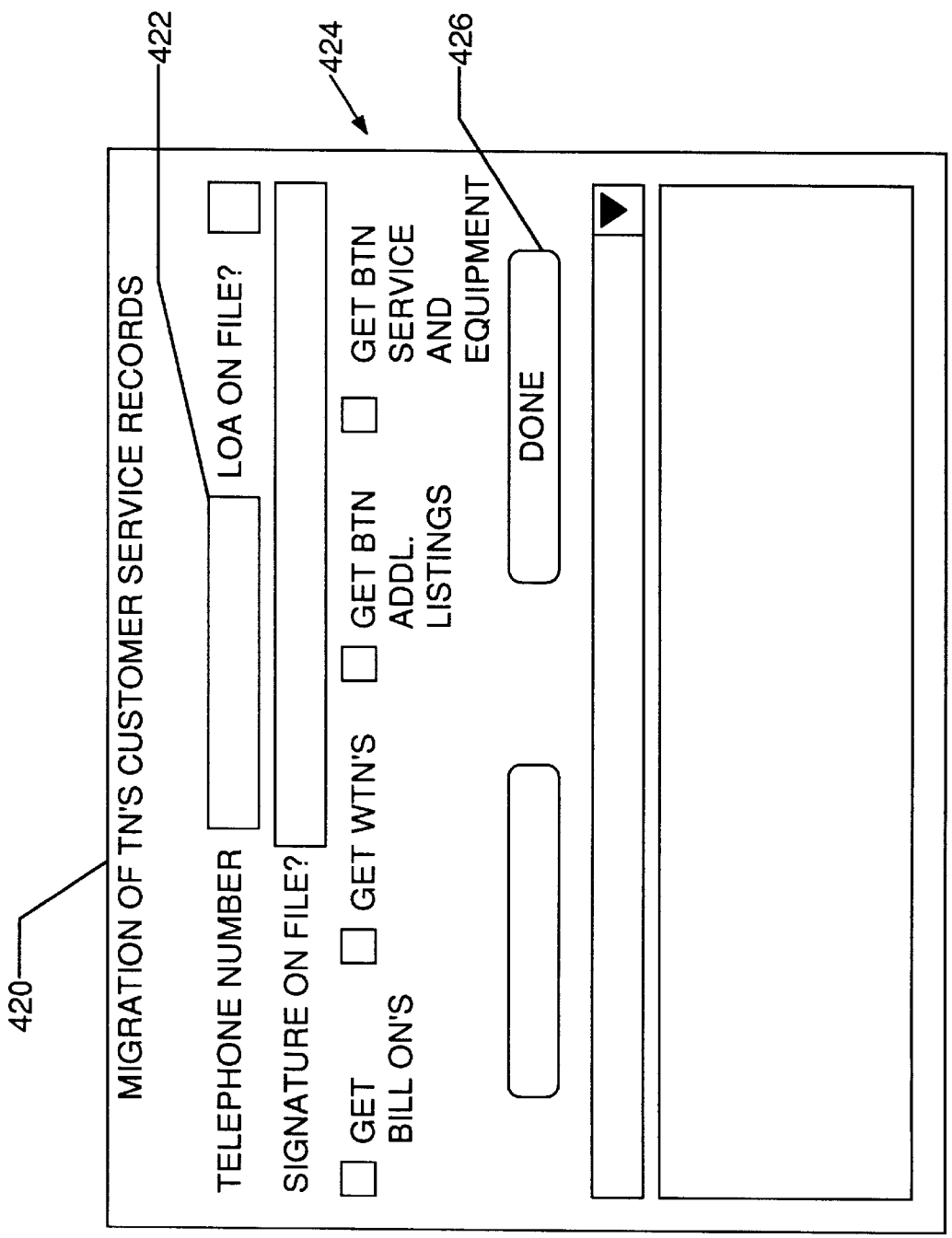
FIG. 7 is an exemplary telephone number migration screen displayed by the system of FIG. 1.
Figure 8:
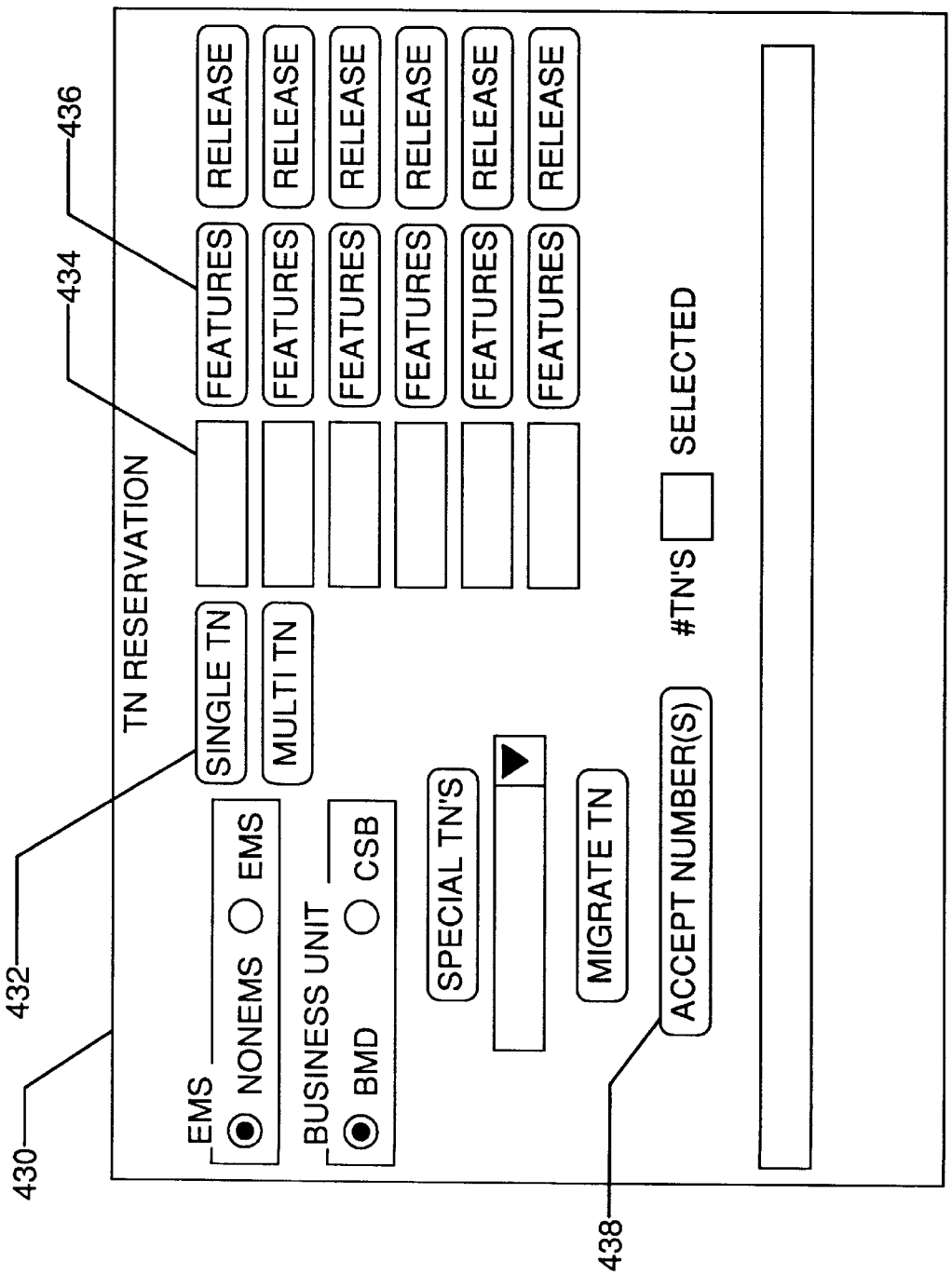
FIG. 8 is an exemplary telephone number reservation screen displayed by the system of FIG. 1.

If an old number is being migrated, or if both a new number is being assigned and an old number is being migrated, the process continues with step 312, in which a telephone number migration screen, such as the exemplary screen shown in FIG. 7, is displayed. Telephone number migration is an operation in which information relating to a telephone number at an address is stored and utilized to create a customer service record. Typically, information that identifies the service features provisioned for the telephone number are transferred. The information identifying the telephone number to be migrated and the information to be transferred is entered into the screen, then, in step 314, the old telephone number and features are migrated to the validated address. In step 316, it is determined whether an old number is being migrated, or whether both a new number is being assigned and an old number is being migrated. If both are being done, or if, in step 310, it was determined that the number being provisioned is a new telephone number, the process continues with step 318, in which a telephone number reservation screen, such as the exemplary screen shown in FIG. 8, is displayed. Telephone number reservation screen allows a new telephone number to be selected and allows access to the feature selection screen for the number. The requested information is entered, then, in step 320, the new telephone number is assigned to the validated address. The process then continues with step 322, as it does if, in step 316, it was determined that no new telephone number is being assigned.

Figure 9:
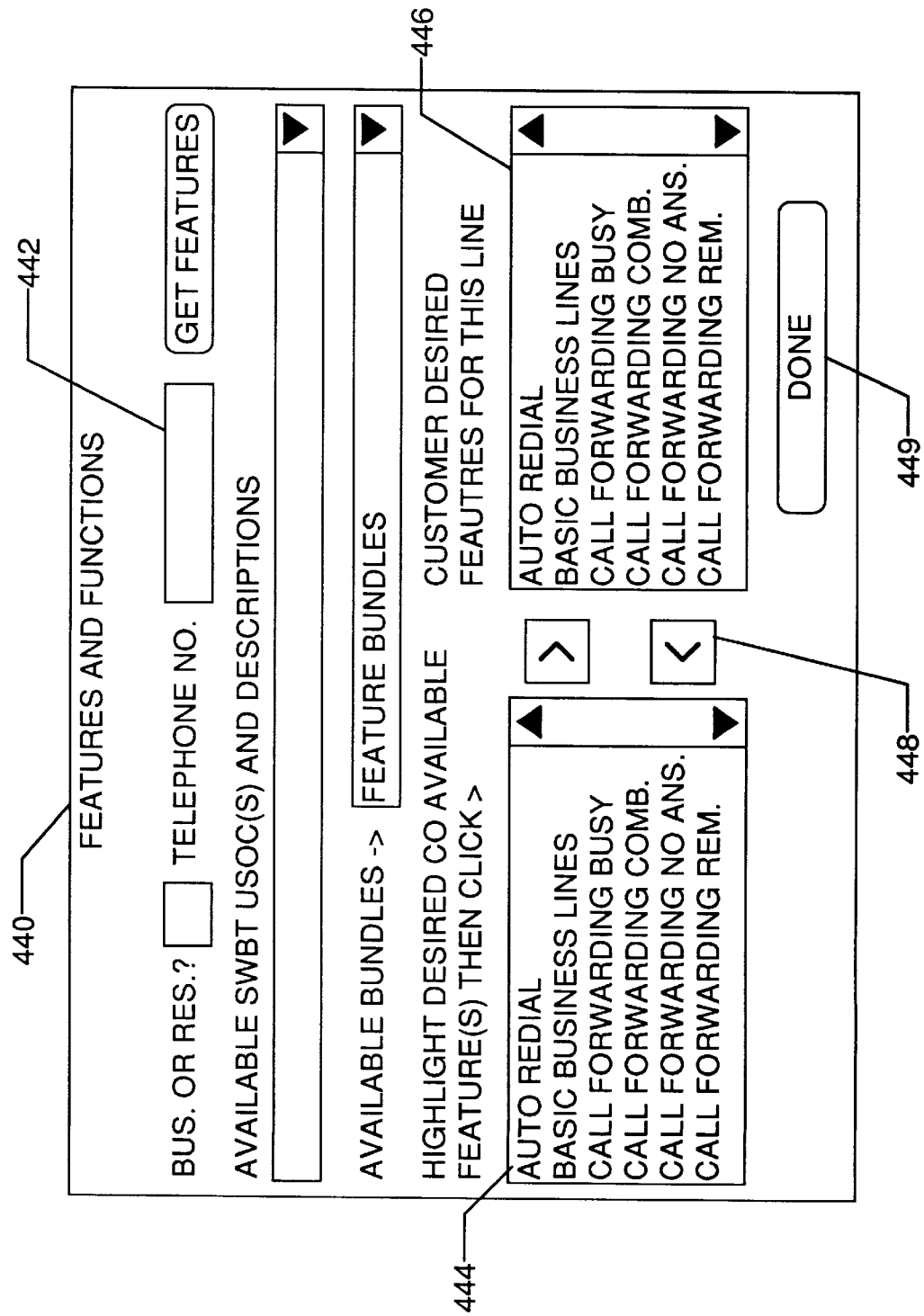
FIG. 9 is an exemplary feature selection screen displayed by the system of FIG. 1.
Figure 10:
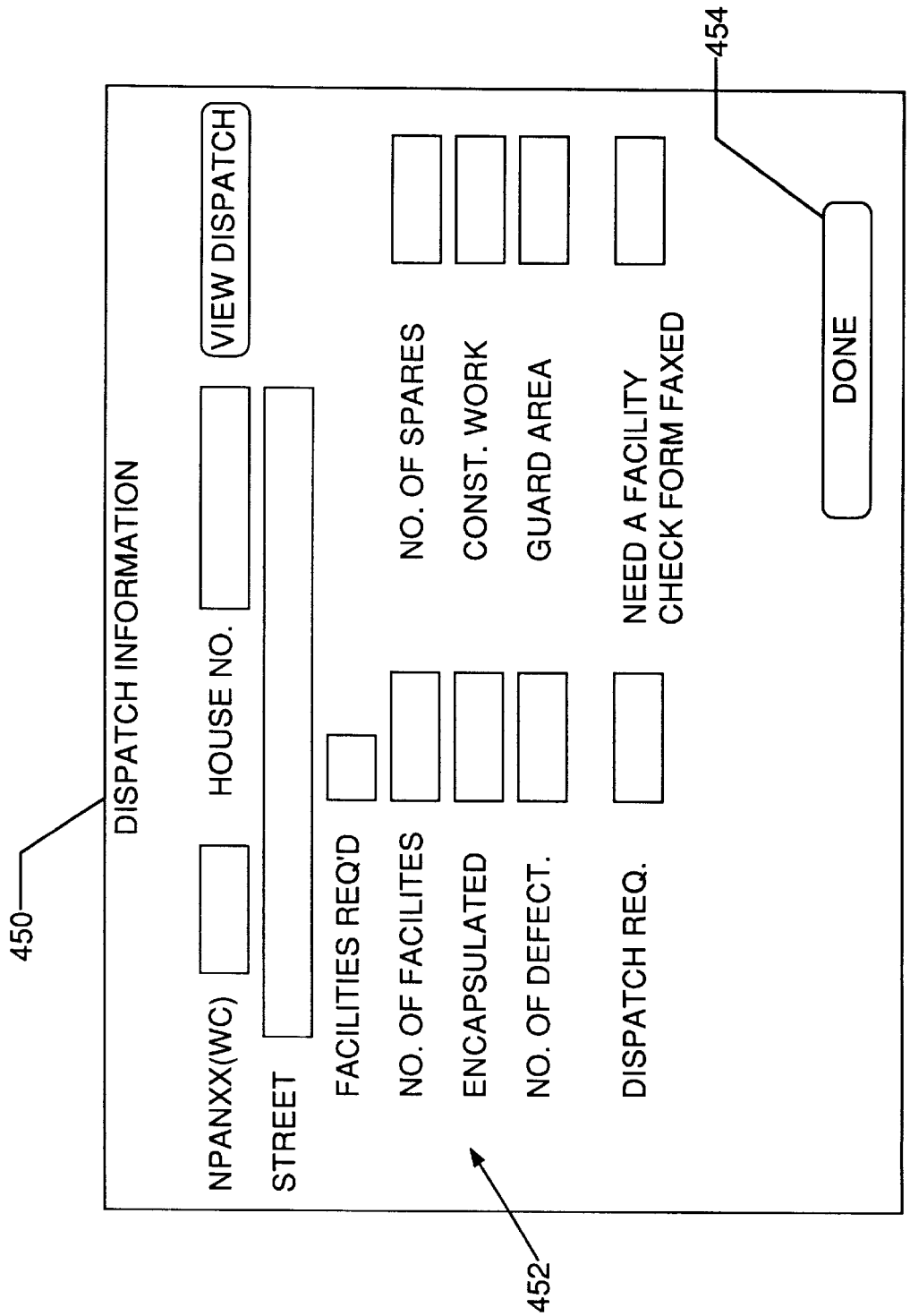
FIG. 10 is an exemplary dispatch information screen displayed by the system of FIG. 1.
Figure 11:
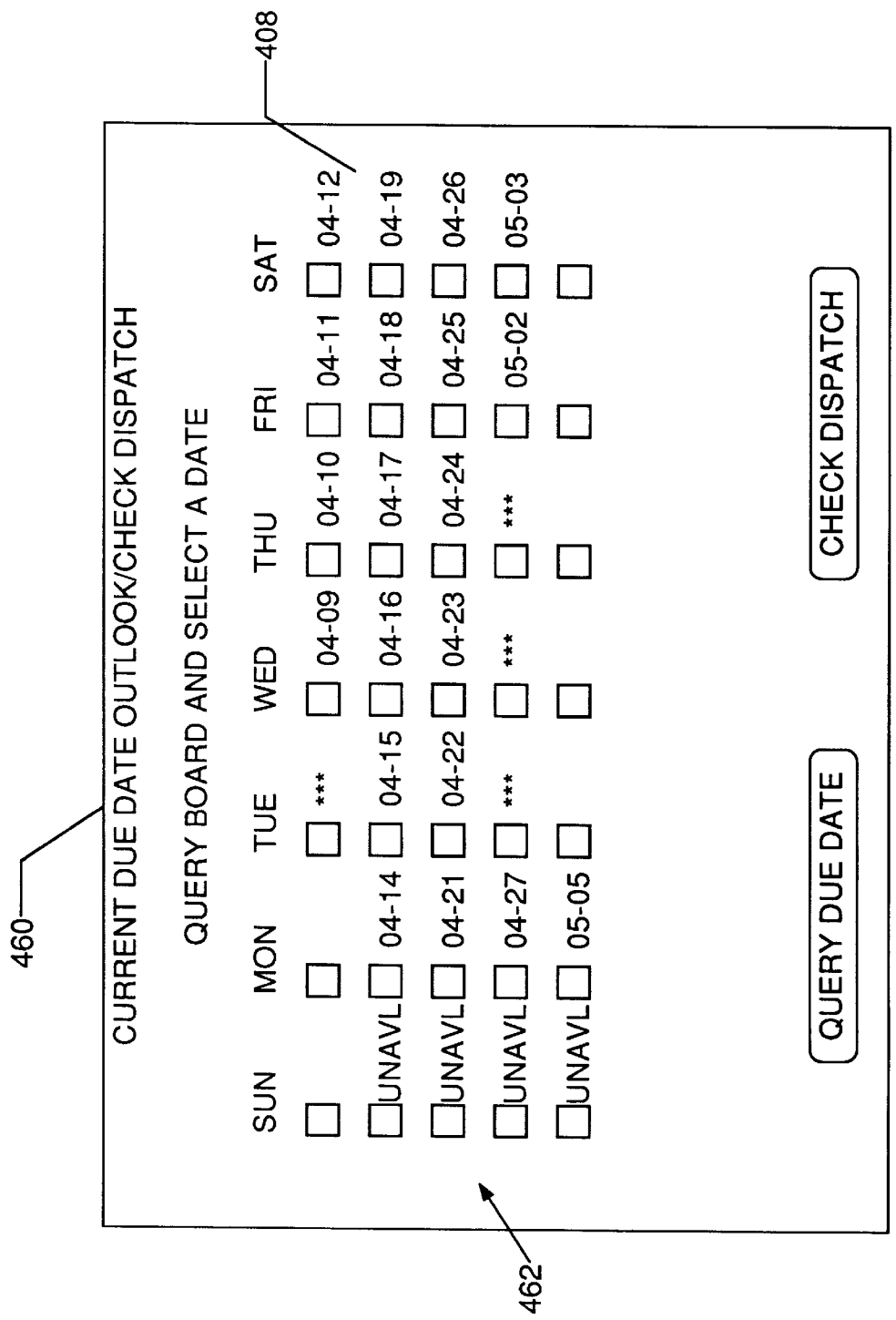
FIG. 11 is an exemplary installation date selection screen displayed by the system of FIG. 1.

In step 322, a feature selection screen, such as the exemplary screen shown in FIG. 9, is displayed. In step 324, the available features for each telephone number being newly provisioned are accessed and displayed. In step 326, the available features are compared to the features being offered to the customer. Those features that are available, being offered and are desired by the customer are selected. In step 328, a dispatch information screen, such as the exemplary screen shown in FIG. 10, is displayed. The dispatch information screen includes information about the facilities that are present at the address at which service is to be established, which is the validated address. In step 330, the facilities that are required to install the service being provisioned are determined using the information from the dispatch information screen. The required facilities are then entered into the dispatch information screen. In step 332, an installation date selection screen, such as the exemplary screen shown in FIG. 11, is displayed. The installation date selection screen displays installation dates that are available for the validated customer address. In step 334, an installation date is selected. The provisioning order is now complete. In step 336, the completed order is accepted or rejected and a hard copy is output.

An exemplary address validation and long distance primary interexchange carrier (PIC) selection screen 400 is shown in FIG. 6. Screen 400 includes fields in which customer and address information are to be entered, such as customer name field 402, address field 404, zip code field 406, city field 408 and state field 410. These fields allow entry of the service address that is to be validated. Telephone number fields, such as field 412, allow entry of the telephone numbers that are being provisioned at the validated address. Long distance PIC selection field 414 allows selection of the long distance PIC for the telephone numbers being provisioned. Preferably, the carriers are selected from a list that is displayed, such as pull-down list 416.

An exemplary telephone number migration screen 420 is shown in FIG. 7. Screen 420 includes fields in which telephone number migration information is to be entered. For example, telephone number field 422 allows entry of the telephone number to be migrated and option boxes 424, allow specification of the information that is to be retrieved and transferred to the validated address. The telephone number migration operation is performed upon activation of the done button 426.

An exemplary telephone number reservation screen 430 is shown in FIG. 8. Screen 430 includes buttons 432 that allow selection of whether single or multiple telephone numbers are reserved. Telephone number fields, such as field 434, display the reserved telephone numbers. Features buttons, such as button 436, allow selection of service features for each number by causing the feature selection screen for a number to be displayed. Acceptance button 438 causes the telephone numbers and their associated service features to be accepted, and the process then moves forward to dispatch and due date.

An exemplary feature selection screen 440 is shown in FIG. 9. Screen 440 allows the service features for a telephone number to be selected. Telephone number field 442 displays and/or allows entry of the telephone number for which features are to be selected. Available features list 444 displays the features that are available for the displayed telephone number. In order to be displayed in list 444, a feature must be technically available, that is supported by the telephone hardware and software used by the telephone number, and also must be available to be offered to the customer by the telephone company. Those features that are both technically available and available for offer are displayed in list 444. Desired features list 446 displays those service features that the customer desires, selected from among those features displayed in list 444. Selection buttons, such as button 448, allow desired features to be selected and unselected. Activation of the done button 449 causes the features displayed in desired features list 446 to be ordered for the displayed telephone number.

An exemplary dispatch information screen 450 is shown in FIG. 10. The dispatch information screen displays information 452 about the facilities that are present at the address at which service is to be established, which is the validated address. The facilities that are required to install the service being provisioned are entered into the dispatch information screen. Activation of the done button 454 causes the features displayed in desired features list 446 to be ordered for the displayed telephone number.

An exemplary date selection screen 460, is shown in FIG. 11. The installation date selection screen displays installation dates 462 that are available for the validated customer address.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of telephone service provisioning pre-order entry comprising the steps of:
   a) receiving customer information including an address;
   b) displaying an address validation screen, including a field requesting an address;
   c) entering the customer information, including the address, into the address validation screen;
   d) validating the address;
   e) displaying a first list of a plurality of available long distance primary interexchange carriers;
   f) selecting a long distance primary interexchange carrier from the displayed first list;
   g) displaying a feature selection screen including a second list of telephone service features that are both available for provisioning and being offered;
   h) selecting a telephone service feature from the displayed second list;
   i) displaying a dispatch information screen including information relating to telephone service facilities that are present at the validated address;
   j) determining facilities that are required for installation of telephone service at the validated address;
   k) displaying an installation date selection screen including available installation dates;
   l) selecting an installation date from among the available installation dates;
   m) accepting or rejecting an order including information entered in steps a–l; and
   n) outputting a record of the order.

2. The method of claim 1, further comprising the steps of:
   responsive to determining that a new telephone number is to be reserved, displaying a telephone number reservation screen; and
   assigning a new telephone number to the validated address.

3. The method of claim 1, further comprising the steps of:
   responsive to determining that a telephone number is to be migrated, displaying a telephone number migration screen; and
   migrating the telephone number and associated features to the validated address.

4. The method of claim 1, further comprising the steps of:
   responsive to determining that a new telephone number is to be reserved and that a telephone number is to be migrated, displaying a telephone number reservation screen;
   assigning a new telephone number to the validated address;
   displaying a telephone number migration screen; and
   migrating the telephone number and associated features to the validated address.

5. The method of claim 4, wherein the step of displaying the feature selection screen comprises the steps of:
   accessing a first database to obtain telephone service features that are available for provisioning at the validated address;
   accessing a second database to obtain telephone service features that are being offered at the validated address;
   comparing the telephone service features that are available for provisioning with the telephone service features that are being offered; and
   displaying telephone service features that are both available for provisioning and being offered.

6. A system for telephone service provisioning pre-order entry comprising the steps of:
   a processor;
   a memory containing a pre-ordering client program comprising program instructions executable by the processor for performing the steps of:
      a) receiving customer information including an address;
      b) displaying an address validation screen, including a field requesting an address;
      c) entering the customer information, including the address, into the address validation screen;
      d) validating the address;
      e) displaying a first list of a plurality of available long distance primary interexchange carriers;
      f) selecting a long distance primary interexchange carrier from the displayed first list;
      g) displaying a feature selection screen including a second list of telephone service features that are both available for provisioning and being offered;
      h) selecting a telephone service feature from the displayed second list;
      i) displaying a dispatch information screen including information relating to telephone service facilities that are present at the validated address;
      j) determining facilities that are required for installation of telephone service at the validated address;

k) displaying an installation date selection screen including available installation dates;

l) selecting an installation date from among the available installation dates;

m) accepting or rejecting an order including information entered in steps a–l; and n) outputting a record of the order.

7. The system of claim 6, wherein the pre-ordering client program comprises program instructions for performing the further steps of:

responsive to determining that a new telephone number is to be reserved, displaying a telephone number reservation screen; and assigning a new telephone number to the validated address.

8. The system of claim 6, wherein the pre-ordering client program comprises program instructions for performing the further steps of:

responsive to determining that a telephone number is to be migrated, displaying a telephone number migration screen; and migrating the telephone number and associated features to the validated address.

9. The system of claim 6, wherein the pre-ordering client program comprises program instructions for performing the further steps of:

responsive to determining that a new telephone number is to be reserved and that a telephone number is to be migrated, displaying a telephone number reservation screen;

assigning a new telephone number to the validated address;

displaying a telephone number migration screen; and migrating the telephone number and associated features to the validated address.

10. The system of claim 9, wherein the program instructions for performing the step of displaying the feature selection screen comprise program instructions for performing the steps of:

accessing a first database to obtain telephone service features that are available for provisioning at the validated address;

accessing a second database to obtain telephone service features that are being offered at the validated address;

comparing the telephone service features that are available for provisioning with the telephone service features that are being offered; and displaying telephone service features that are both available for provisioning and offered.

11. A computer program storage device, comprising:

a computer readable medium embodying computer program instructions for telephone service provisioning pre-order entry, the computer program instructions executable by a processor for performing the steps of:

a) receiving customer information including an address;

b) displaying an address validation screen, including a field requesting an address;

c) entering the customer information, including the address, into the address validation screen;

d) validating the address;

e) displaying a first list of a plurality of available long distance primary interexchange carriers;

f) selecting a long distance primary interexchange carrier from the displayed first list;

g) displaying a feature selection screen including a second list of telephone service features that are both available for provisioning and being offered;

h) selecting a telephone service feature from the displayed second list;

i) displaying a dispatch information screen including information relating to telephone service facilities that are present at the validated address;

j) determining facilities that are required for installation of telephone service at the validated address;

k) displaying an installation date selection screen including available installation dates;

l) selecting an installation date from among the available installation dates;

m) accepting or rejecting an order including information entered in steps a–l; and n) outputting a record of the order.

12. The computer program storage device of claim 11, wherein the computer program instructions further perform the steps of:

responsive to determining that a new telephone number is to be reserved, displaying a telephone number reservation screen; and assigning a new telephone number to the validated address.

13. The computer program storage device of claim 11, wherein the computer program instructions further perform the steps of:

responsive to determining that a telephone number is to be migrated, displaying a telephone number migration screen; and migrating the telephone number and associated features to the validated address.

14. The computer program storage device of claim 11, wherein the computer program instructions further perform the steps of:

responsive to determining that a new telephone number is to be reserved and that a telephone number is to be migrated, displaying a telephone number reservation screen;

assigning a new telephone number to the validated address;

displaying a telephone number migration screen; and migrating the telephone number and associated features to the validated address.

15. The computer program storage device of claim 14, wherein the program instructions for performing the step of displaying the feature selection screen comprise program instructions for performing the steps of:

accessing a first database to obtain telephone service features that are available for provisioning at the validated address;

accessing a second database to obtain telephone service features that are being offered at the validated address;

comparing the telephone service features that are available for provisioning with the telephone service features that are being offered; and displaying telephone service features that are both available for provisioning and offered.

16. A system for telephone service provisioning pre-order entry comprising the steps of:

means for receiving customer information including an address;

means for displaying an address validation screen, including the address, into the address validation screen;

means for validating the address;

means for displaying a first list of a plurality of available long distance primary interexchange carriers;

means for selecting a long distance primary interexchange carrier from the displayed first list;

means for displaying a feature selection screen including a second list of telephone service features that are both available for provisioning and being offered;

means for selecting a telephone service feature from the displayed second list;

means for displaying a dispatch information screen including information relating to telephone service facilities that are present at the validated address;

means for determining facilities that are required for installation of telephone service at the validated address;

means for displaying an installation date selection screen including available installation dates;

means for selecting an installation date from among the available installation dates;

means for accepting or rejecting an order including information entered in steps a–l; and means for outputting a record of the order.

17. The system of claim 16, further comprising:

means for displaying a telephone number reservation screen, responsive to determining that a new telephone number is to be reserved; and means for assigning a new telephone number to the validated address.

18. The system of claim 16, further comprising:

means for displaying a telephone number migration screen, responsive to determining that a telephone number is to be migrated; and means for migrating the telephone number and associated features to the validated address.

19. The method of claim 16, further comprising:

means for displaying a telephone number reservation screen, responsive to determining that a new telephone number is to be reserved and that a telephone number is to be migrated;

means for assigning a new telephone number to the validated address;

means for displaying a telephone number migration screen; and means for migrating the telephone number and associated features to the validated address.

20. The system of claim 19, wherein the means for displaying the feature selection screen comprises:

means for accessing a first database to obtain telephone service features that are available for provisioning at the validated address;

means for accessing a second database to obtain telephone service features that are being offered at the validated address;

means for comparing the telephone service features that are available for provisioning with the telephone service features that are being offered; and means for displaying telephone service features that are both available for provisioning and offered.

* * * * *